United States Patent
Snowbarger et al.

(10) Patent No.: US 10,185,330 B2
(45) Date of Patent: Jan. 22, 2019

(54) METHODS AND SYSTEMS FOR ADJUSTING TRAVEL SENSOR ALIGNMENT ON PROCESS CONTROL VALVES

(71) Applicant: FISHER CONTROLS INTERNATIONAL LLC, Marshalltown, IA (US)

(72) Inventors: Jimmie L. Snowbarger, Marshalltown, IA (US); Perry K. Carter, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 768 days.

(21) Appl. No.: 14/320,225

(22) Filed: Jun. 30, 2014

(65) Prior Publication Data

US 2015/0378365 A1 Dec. 31, 2015

(51) Int. Cl.
G05D 7/06 (2006.01)
G05B 15/02 (2006.01)
F16K 37/00 (2006.01)

(52) U.S. Cl.
CPC ....... *G05D 7/0635* (2013.01); *F16K 37/0033* (2013.01); *F16K 37/0083* (2013.01); *G05B 15/02* (2013.01)

(58) Field of Classification Search
CPC .............. G05D 7/0635; F16K 37/0083; F16K 37/0033; G05B 15/02
USPC ........................................................ 702/85
See application file for complete search history.

(56) References Cited

U.S. PATENT DOCUMENTS

| | | | | |
|---|---|---|---|---|
| 7,535,411 B2 * | 5/2009 | Falco | | G01B 7/008 342/165 |
| 2011/0088867 A1 * | 4/2011 | Steele | | F24F 3/1423 165/9 |
| 2012/0056115 A1 | 3/2012 | Briley et al. | | |

FOREIGN PATENT DOCUMENTS

| | | |
|---|---|---|
| CN | 103777651 A | 5/2014 |
| WO | WO-2008/078323 A1 | 7/2008 |
| WO | WO-2014/066209 A1 | 5/2014 |

OTHER PUBLICATIONS

Search Report for PCT/US2015/038432 dated Oct. 2, 2015.
(Continued)

*Primary Examiner* — Yoshihisa Ishizuka
(74) *Attorney, Agent, or Firm* — Marshall, Gerstein & Borun LLP

(57) ABSTRACT

To simplify the process of adjusting travel sensor alignments on process control valves, a method and system generates a graphical interface to display alignment information to a user or operator. The graphical interface visualizes the state of alignment between a feedback element and a sensing element that comprise a magnetic travel sensor on a process control valve. Using the graphical interface, the user or operator can easily determine whether the alignment between the feedback element and the sensing element is proper or correct. The graphical interface also provides information on whether or not physical adjustments are needed in order to fix detected alignment problems so that impending failures can be avoided and optimal performances can be achieved. In this manner, the method and system improves the reliability and accuracy of valve travel feedback.

20 Claims, 4 Drawing Sheets

(56) References Cited

OTHER PUBLICATIONS

Written Opinion for PCT/US2015/038432 dated Oct. 2, 2015.
First Office Action for CN Application No. 201510325046.5 dated Sep. 12, 2018.

* cited by examiner

METHODS AND SYSTEMS FOR ADJUSTING TRAVEL SENSOR ALIGNMENT ON PROCESS CONTROL VALVES

FIELD OF THE DISCLOSURE

This disclosure relates generally to sensor calibration and, more particularly, to methods and systems for adjusting travel sensor alignments used in process control valves.

BACKGROUND

Process control plants and systems use control valves in a wide variety of applications. Typically, control valves are used to manage product flow by functioning like a variable orifice or passage. A control valve is generally automated using an actuator and a remotely operated instrument which communicates between a process control computer and the actuator to command flow changes within the valve to achieve the desired control strategy. Travel sensors that measure the position of the valve play a critical role in maintaining accurate process control.

When the process control computer issues a command to modify flow, the remotely operated instrument must read the present valve position and apply appropriate corrective action through the actuator. A typical actuator is driven by a pressurized air source, which is controlled by the remotely operated instrument. For example, in a spring and diaphragm actuator used on a linear or sliding stem valve, variations in air pressure applied to a large diaphragm cause movement or displacement of the diaphragm. Attached to the diaphragm is an actuator stem, which in turn is connected to a valve plug. By changing air pressure to the diaphragm, the remotely operated instrument can directly position the valve plug and therefore control flow through the control valve. In order to properly control flow, the instrument must always know where the valve plug is and where it must move to in response to a command. This is accomplished by attaching a travel sensor between the remotely operated instrument and the actuator stem. The output of the travel sensor may be directly connected to the remotely operated instrument to provide stem position feedback for precise valve control.

Traditional travel sensors, such as potentiometers, require moving mechanica linkages to couple movement or displacement into the sensor. However, mechanical linkages have contact or wear points. As such, during rugged service conditions, instabilities can break the mechanical linkages at the wear points thereby disconnecting the valve stem from the remotely operated instrument. To improve sensor reliability, recent sensor designs have migrated to non-contacting position detection methods.

One type of non-contacting sensor design is a magnetic travel sensor, which detects displacement between two objects by attaching a feedback element (e.g., a magnetic flux source) to the first object and a sensing element (e.g., a magnetic sensor) to the second object. The feedback element produces a magnetic field that is detected by the sensing element. Any movement by one or both objects producing relative displacement presents a different portion of the magnetic field to the sensing element, thereby changing the output of the sensor. This output can be directly related to the relative displacement between the actuator and the valve stem.

The accurate functioning of the magnetic travel sensor depends on the proper alignment of the feedback and sensing elements. However, due to factors such as improper installations, excessive vibrations, and/or other environmental effects, the feedback element may become loose and move over time. This can result in misalignment with respect to the sensing element which in turn can cause the sensor to become inoperable.

SUMMARY

In accordance with a first exemplary aspect of the invention, a computer-implemented method for adjusting alignment of a magnetic travel sensor on a process contro valve comprises determining a travel length of a feedback element of the magnetic trave sensor. The feedback element is coupled to an actuator stem of an actuator that operates the process control valve. The method then determines a travel range of the actuator stem. The method also determines a travel motion of the feedback element. Further, the method determines a current position of the process control valve. Still further, the method generates alignment information for the magnetic travel sensor based on the determined travel length of the feedback element, the travel range of the actuator stem, the travel motion of the feedback element, and the current position of the process control valve. Finally, the method generates a graphical interface to display the alignment information.

In accordance with a second exemplary aspect of the invention, a non-transitory computer-readable storage medium comprises computer-readable instructions to be executed on one or more processors of a system for adjusting alignment of a magnetic travel sensor on a process control valve. The instructions when executed cause the one or more processors to determine a travel length of a feedback element of the magnetic travel sensor. The feedback element is coupled to an actuator stem of an actuator that operates the process control valve. The instructions when executed then cause the one or more processors to determine a trave range of the actuator stem. The instructions when executed also cause the one or more processors to determine a travel motion of the feedback element. Further, the instructions when executed cause the one or more processors to determine a current position of the process control valve. Still further, the instructions when executed cause the one or more processors to generate alignment information for the magnetic travel sensor based on the determined trave length of the feedback element, the travel range of the actuator stem, the travel motion of the feedback element, and the current position of the process control valve. Finally, the instructions when executed cause the one or more processors to generate a graphical interface to display the alignment information.

In accordance with a third exemplary aspect of the invention, a system for adjusting travel sensor alignment on a process control valve comprises a magnetic travel sensor that includes a feedback element and a sensing element, and a device coupled to the magnetic trave sensor that includes a memory having instructions for execution on one or more processors. The instructions when executed by the one or more processors cause the device to determine a travel length of the feedback element. The feedback element is coupled to an actuator stem of an actuator that operates the process control valve. The instructions when executed by the one or more processors then cause the device to determine a travel range of the actuator stem and to determine a travel motion of the feedback element. The instructions when executed by the one or more processors also cause the device to determine a current position of the process contro valve. Further, the instructions when executed by the one or more processors cause the device to calculate an expected sensor reading based on the determined travel length of the feedback element, the travel range of the actuator stem, the travel motion of the feedback element, and the current position of the process control valve. Still further, the instructions when executed by the one or more processors cause the device to determine a current sensor reading based on readings from the sensing element which measures the movement of the feedback element. Additionally, the instructions when executed by the one or more processors cause the device to compare the expected sensor reading and the current sensor reading to determine a state of alignment between the feedback element and the sensing element. Finally, the instructions when executed by the one or more processors cause the device to generate a graphical interface to display the state of alignment.

In further accordance with any one or more of the foregoing first, second, or third exemplary aspects, the invention may include any one or more of the following further preferred forms.

In one preferred form, generating the alignment information comprises calculating an expected sensor reading based on the determined travel length of the feedback element, the travel range of the actuator stem, the travel motion of the feedback element, and the current position of the process control valve. Generating the alignment information also comprises determining a current sensor reading based on readings from a sensing element of the magnetic travel sensor that measures the movement of the feedback element. Further, generating the alignment information comprises comparing the expected sensor reading and the current sensor reading to determine a state of alignment between the feedback element and the sensing element.

In another preferred form, adjusting alignment of the magnetic travel sensor on the process control valve further comprises determining an expected sensor travel range based on the expected sensor reading, and displaying the state of alignment in the graphical interface in terms of the expected sensor travel range and a maximum available sensor range. The maximum available sensor range is associated with the determined travel length of the feedback element.

In another preferred form, displaying the state of alignment in the graphical interface includes displaying a solid bar within a box, where the solid bar has a height that corresponds to the expected sensor travel range, and the box has a height greater than the height of the solid bar and that corresponds to the maximum available senor range.

In another preferred form, the state of alignment indicates a perfect alignment when the solid bar is centered in the box.

In another preferred form, the state of alignment indicates a misalignment when the solid bar is off-centered in the box.

In another preferred form, displaying the state of alignment in the graphical interface further includes providing instructions in the graphical interface to instruct a user to physically adjust the feedback element in order to correct the misalignment.

In another preferred form, displaying the state of alignment in the graphical interface further includes sending an alert to notify a user of the misalignment.

In another preferred form, the feedback element is a magnetic array, and the sensing element is a magnetic sensor.

DETAILED DESCRIPTION

Figure 1A:
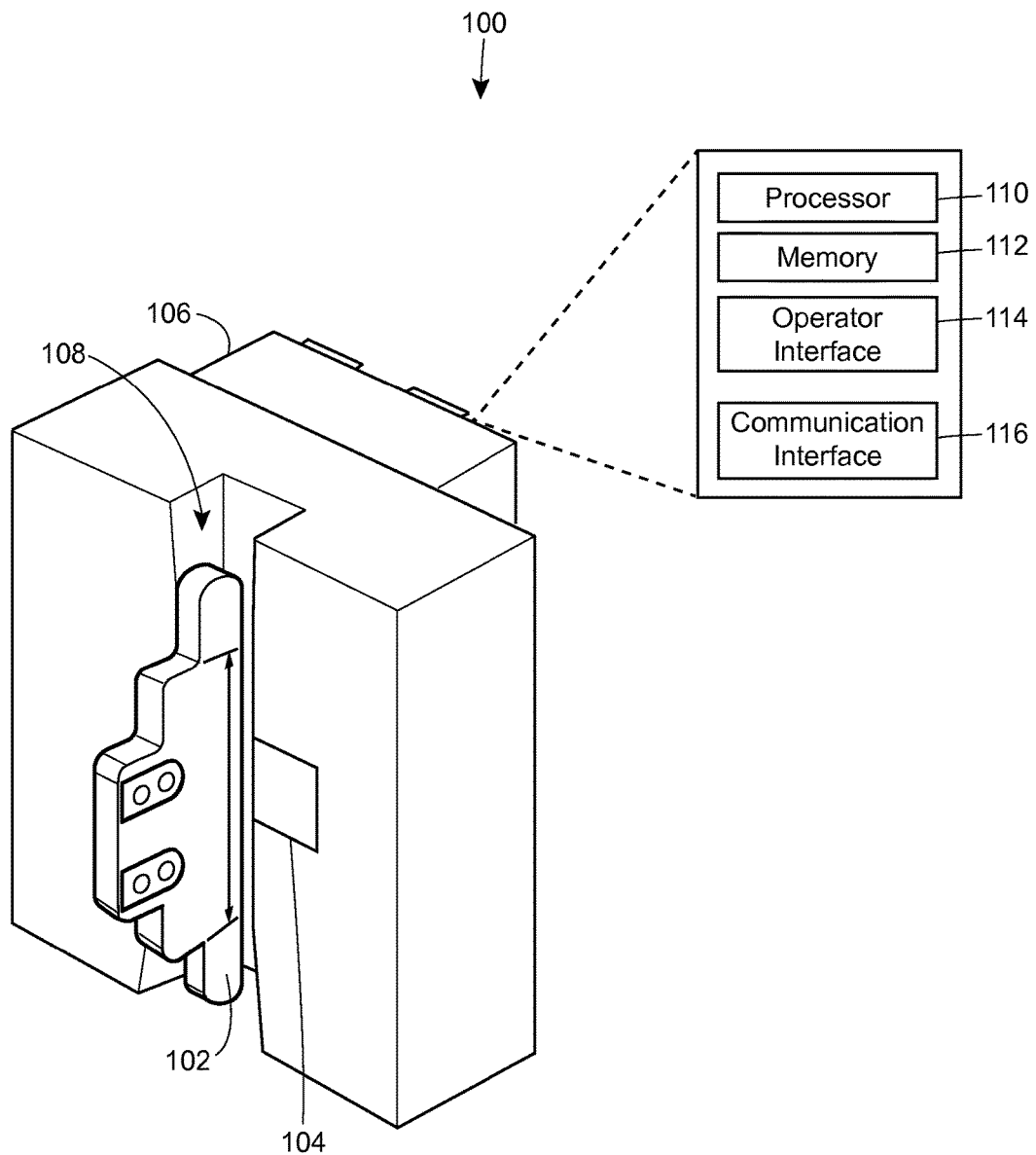
FIG. 1A is a perspective view of an example magnetic travel sensor assembly.

FIG. 1A illustrates a perspective view of an example magnetic travel sensor assembly 100, which includes a feedback element 102 and a sensing element 104 that is connected to a control instrument 106.

The feedback element 102 corresponds to a magnetic flux source, such as a magnet, that produces a magnetic field. In the embodiment of FIG. 1A, the feedback element 102 is in the form of an array of magnets or magnetic array. The feedback element 102 may be coupled or mounted, via suitable brackets or clamps, to a shaft or stem of an actuator that operates to open and close a process control valve 122 (see FIG. 1B).

The sensing element 104 corresponds to a magnetic sensor (e.g., a Hall effect sensor, a magneto-resistor, a giant magneto-resistive bridge, a flux gate, etc.) that detects the magnetic field produced by the feedback element 102. As shown in FIG. 1A, the sensing element 104 is located within the control instrument 106. More particularly, the sensing element 104 is positioned in a channel 108 through which the feedback element 102 may move to be monitored by the sensing element 104. In this manner, the sensing element 104 in the channe 108 detects the movement of the feedback element 102 in a linkage-less and/or non-contact manner.

The control instrument 106 includes a processor 110, a memory 112, an operator interface 114, and a communication interface 116. The memory 112 stores instructions that may be executed by the processor 110 to provide control to the process control valve. The operator interface 114 allows a user or operator to interact with the instrument 106, while the communication interface 116 allows communication between the instrument 106 and other devices or peripheral equipment. In an embodiment, the control instrument 106 is remotely operated via the communication interface 116.

Figure 1B:
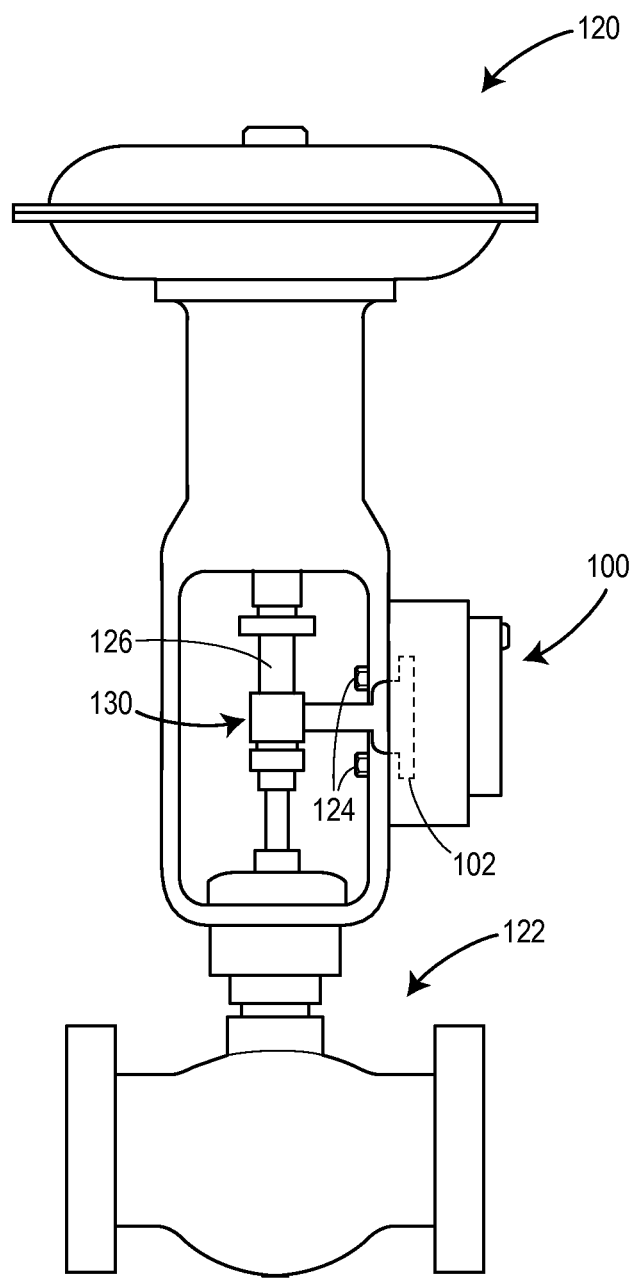
FIG. 1B is a perspective view of the example magnetic travel sensor assembly of FIG. 1A mounted to a linear actuator coupled to a process control valve.

FIG. 1B illustrates a perspective view of the example magnetic travel sensor assembly 100 of FIG. 1A mounted to a linear actuator 120 that is coupled to a process control valve 122. In the embodiment of FIG. 1B, the example magnetic travel sensor assembly 100 is secured directly to the actuator 120 via bolts 124. Alternatively, the example magnetic travel sensor assembly 100 may be mounted to the actuator 120 indirectly via any suitable bracket, clamp, and/or other means. In FIG. 1B, the magnetic travel sensor assembly 100 is oriented relative to the actuator 120 such that the channel 108 is parallel to an actuator stem 126. The actuator stem 126 is operatively coupled in a known manner to a control element. Further, the example magnetic travel sensor assembly 100 is positioned such that the channel 108 is accessible to receive the feedback element 102 (e.g., a magnetic array). Accordingly, FIG. 1B also shows a bracket assembly 130 used to couple the feedback element 102 to the actuator stem 126 and hold the feedback element 102 within the channel 108 of the example magnetic travel sensor assembly 100.

In this manner, as the actuator stem 126 moves to open and/or close the process control valve 122, the feedback element 102 moves within the channel 108 to enable the sensing element 104 of the example magnetic travel sensor assembly 100 to monitor the movement. The control instrument 106 of the example magnetic travel sensor assembly 100 may then obtain position or travel information of the process control valve 122 via the sensing element 104. Using the monitored position or travel information, the control instrument 106 can adjust the process control valve 122 based on control algorithms executed by the processor 110 and/or based on control signals received from a process control computer or any other external device.

While FIG. 1B illustrates the example magnetic travel sensor assembly 100 as being used to automate a linear valve, the example magnetic travel sensor assembly 100 in genera may be used to automate other types of process control valves (e.g., a rotary valve, a quarter-turn valve, etc.) used in a process control plant or system.

To obtain accurate position or travel information of the process control valve 122, the feedback element 102 and the sensing element 104 must be properly aligned such that the feedback element 102 is within the valid detection range of the sensing element 104 throughout the range of travel. Typically, alignment is accomplished during the installation stage by using an alignment template to correctly position the feedback element 102 in relation to the sensing element 104.

However, if the installation is performed poorly, then the feedback element 102 may be misaligned with respect to the sensing element 104. Further, because of high vibrations that may occur during valve operations and/or because of other environmental effects, the feedback element 102 may become loose over time and shift out of alignment. While the shift may not always be visually apparent, the shift could be enough to move the feedback element 102 out of the valid detection range of the sensing element 104.

When the process control valve 122 is in operation, it is also difficult to detect any shift in the feedback element 102 because the operator needs to visually observe the alignment of the feedback element 102 within the channel 108. However, this is not always possible as pipes, wires and other equipment often obstruct the operator's line of sight.

Moreover, the operator may try to fix alignment problems by performing an auto-calibration procedure. While this may result in a temporary fix, the auto-calibration procedure will only mask the problems if the feedback element 102 has shifted too much physically. If the alignment problems persist, then there will be a point where the auto-calibration will not be successful and the operator must resort to more detailed troubleshooting.

In order to better facilitate the operator in detecting and monitoring alignment problems, a graphical interface displaying the alignment between the feedback element 102 and the sensing element 104 may be displayed to the operator. Using this graphical interface, the operator can easily view or determine if the alignment is good, bad or borderline. In this regard, the operator is made aware of the current state of the alignment without having to visually observe the alignment or rely on visual cues. This is especially beneficial in low light situations and/or hard to reach locations. The graphical interface can also provide information to the operator on whether physical adjustments are needed or what kinds of physica adjustments are needed in order to fix detected alignment problems. This information is usefu not only for ensuring optimal performance, but also in providing early warnings of impending failures should the feedback element become loose, worn or damaged.

Figure 2:
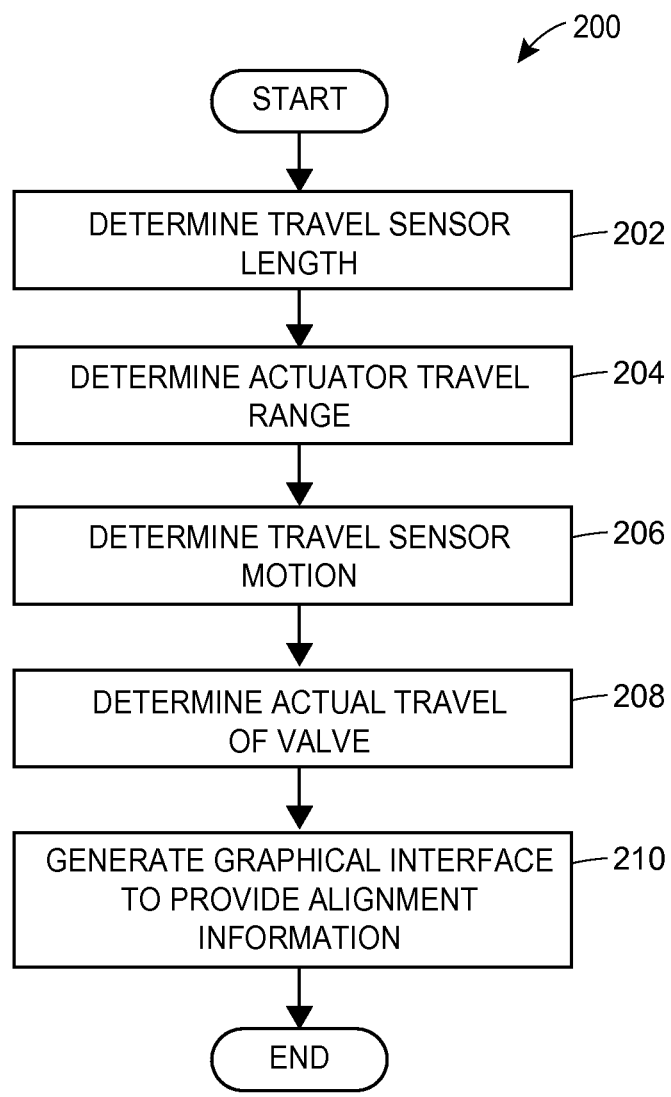
FIG. 2 is a flowchart representative of an example method for adjusting alignment of a magnetic travel sensor on a process control valve.

FIG. 2 illustrates a flowchart of an example method 200 for adjusting alignment of a magnetic travel sensor on a process control valve. The method 200 may include one or more blocks, routines or functions in the form of computer executable instructions that are stored in a tangible computer-readable medium (e.g., 112 of FIG. 1) and executed using a processor (e.g., 110 of FIG. 1). The magnetic travel sensor may include a feedback element (e.g., 102 of FIG. 1) and a sensing element (e.g., 104 of FIG. 1). Accordingly, the method 200 may be executed to ensure that the feedback element is properly aligned with the sensing element.

The method 200 begins by gathering various information associated with the magnetic travel sensor. First, the method 200 determines a travel sensor length (block 202). In particular, the method 200 determines the travel length of the feedback element in the magnetic travel sensor. The travel length of the feedback element corresponds to the maximum available sensor range. This information may be manually entered by a user, for example. In an embodiment, the feedback element is in the form of a magnetic array. There are different types of magnetic arrays which are categorized according to their travel length (e.g., ¾", 1", 2", 4", 8¼", etc.). For any type of magnetic array, the sensing element, such as a Hall effect sensor, will nominally read between a minimum and a maximum raw travel count value regardless of the actual travel length. For example, in many scenarios, the reading will be between 0 and 12,288 raw travel counts.

The method 200 then determines an actuator travel range (block 204). In particular, the method 200 determines the travel range of an actuator stem to which the feedback element is connected to or mounted on. The actuator stem is part of an actuator that may be coupled to the process control valve. As such, by moving the actuator stem, the process control valve can be opened or closed, thereby controlling flow through the valve. The nominal value for the travel range of the actuator stem is typically found on the actuator nameplate. This information may be manually entered by the user, for example.

Generally speaking, in order to obtain accurate travel measurements, the travel length of the magnetic array should be correlated with the travel range of the actuator stem. If the travel length of the magnetic array is chosen to be too short, then even with a perfect alignment, the magnetic array could move outside of the available sensor range. On the other hand, if the travel length of the magnetic array is chosen to be too long, then resolution may be compromised. As a rule of thumb, the travel length of the magnetic array should be chosen such that the travel length is not greater than twice the travel range of the actuator stem. For example, if the actuator stem has a travel range of 1", then a magnetic array with a travel length of no more than 2" should be used.

Next, the method 200 determines a travel sensor motion (block 206). More particularly, the method 200 determines the travel motion of the feedback element. For example, if the magnetic travel sensor is adapted for rectilinear motion, then the travel motion of the feedback element may be from end to end or top to bottom. If the magnetic travel sensor is adapted for rotary motion, then the travel motion of the feedback element may be clockwise or counterclockwise. In general, an increasing reading of the travel motion should be associated with an increasing drive signal. In some scenarios, the reading of the travel motion needs to be inverted depending on which direction the feedback element is moving with respect to the increasing drive signal. Information regarding the travel motion of the feedback element may be manually entered by the user. In an embodiment, the method 200 may determine the travel motion of the feedback element by performing an auto-calibration procedure.

Furthermore, the method 200 determines an actual travel of the process control valve (block 208). Generally, this is a visual estimation of the current physical position of the valve (e.g., normally open, normally closed, half-way open, etc.). The actual travel of the process control valve is typically specified in terms of a percentage. For example, a normally closed valve corresponds to 0% travel. This information may be manually entered by the user, for example.

After gathering the various information in the blocks 202-208, the method 200 proceeds to generate a graphical interface that provides alignment information (block 210). In particular, the method 200 determines an expected sensor reading based on the travel length of the feedback element, the travel range of the actuator stem, the travel motion of the feedback element, and the actual travel of the process control valve. In an embodiment, the method 200 computes the expected sensor reading as raw travel counts (e.g., between 0 and 12,288).

The method 200 also determines a current sensor reading as measured by the sensing element in the magnetic travel sensor. The current sensor reading represents the current physical position of the process control valve as determined by measuring the movement of the feedback element. In an embodiment, the current sensor reading is in the form of raw trave counts (e.g., between 0 and 12,288) collected from the sensing element. By comparing the current sensor reading and the expected sensor reading, the method 200 can assess the state of alignment between feedback element and the sensing element. For example, if the actual trave of the process control valve is determined to be at 0% (e.g., normally closed), and if the current sensor reading and the expected sensor reading show the same value, then the feedback element may be considered to be correctly aligned with respect to the sensing element. On the other hand, if the current sensor reading and the expected sensor reading do not show the same value, then the feedback element may be misaligned.

Moreover, using the expected sensor reading, the method 200 may determine an expected sensor travel range. The method 200 can visually depict the state of alignment in the graphical interface by displaying the expected sensor travel range in terms of the maximum available sensor range.

In an embodiment, the method 200 shows a solid bar that can move (e.g., up and down) within a box in the graphical interface. The solid bar has a height that corresponds to the expected sensor travel range. The height of the box is greater than the height of the solid bar and corresponds to the maximum available sensor range. Perfect alignment is obtained when the solid bar is centered in the box. Accordingly, by observing the position of the solid bar within the box, the user or operator can quickly ascertain whether the alignment is acceptable or problematic. If the alignment shows problems or otherwise requires attention, then the method 200 may inform the operator on what kinds of actions are needed in order to fix or correct the alignment. For example, the method 200 may advise the operator to make certain small or large physical adjustments to reposition the feedback element.

The blocks 202-210 may be repeated multiple times to enable the operator to continuously monitor and adjust the alignment of the magnetic travel sensor on the process control valve. In some embodiments, by using predefined configuration settings, the method 200 can automatically populate or determine the various information needed in the blocks 202, 204 and 206.

In some embodiments, an additional position or travel sensor may be employed in the block 208. The additional position or travel sensor can provide an independent feedback reading to determine the actual travel of the process control valve in the block 208. Thus, this would avoid having the operator to visually estimate the current physical position of the valve. In this manner, the method 200 can be used to provide online diagnostic functions, where the method 200 automatically detects and monitors any alignment problems that may arise. With online diagnostics, the method 200 can also send out alerts to notify operators or other users if potential alignment problems are detected so that the problems can be resolved before they render the magnetic travel senor or the process control valve inoperable.

The method 200 is advantageous when executed during the initial setup stage of a process control valve. This is so because information regarding the actual travel of the valve (block 208) can be made with a degree of certainty (e.g., 0% or 100%). Additionally, during auto-calibration procedures when the process control valve reaches travel extremes, the method 200 can be executed to determine if adjustments are needed.

Of course, the method 200 can also be used to detect alignment problems while the process control valve is in service. For example, while a throttling valve is in a steady state position, the operator can input an estimation of the actual travel of the throttling valve (e.g., 70% travel). The method 200 can then compute alignment information, and if necessary, provides adjustment recommendations. Understandably, any recommendation is only as good as the estimation on the actual travel of the throttling valve. Further, any physical adjustments must be performed at a later time when the valve is actually out of service.

In another scenario, the method 200 can be used to detect alignment problems while an on/off valve is in service. Here, the method 200 may include additional blocks that configure and generate a travel alarm. For example, the travel alarm may be set at −2% and 102% of the actual travel of the valve. As such, in the event that the valve is normally closed (e.g., 0% travel), the lower limit on the travel alarm (−2%) will not be reached and the trave alarm will not trigger. However, if an alignment problem manifests (e.g., if the feedback element shifts), then the perceived travel reading will also shift to be something less than 0% travel. Thus, the travel alarm will be triggered and the operator may be notified to check and correct the detected alignment problem.

Figure 3A:
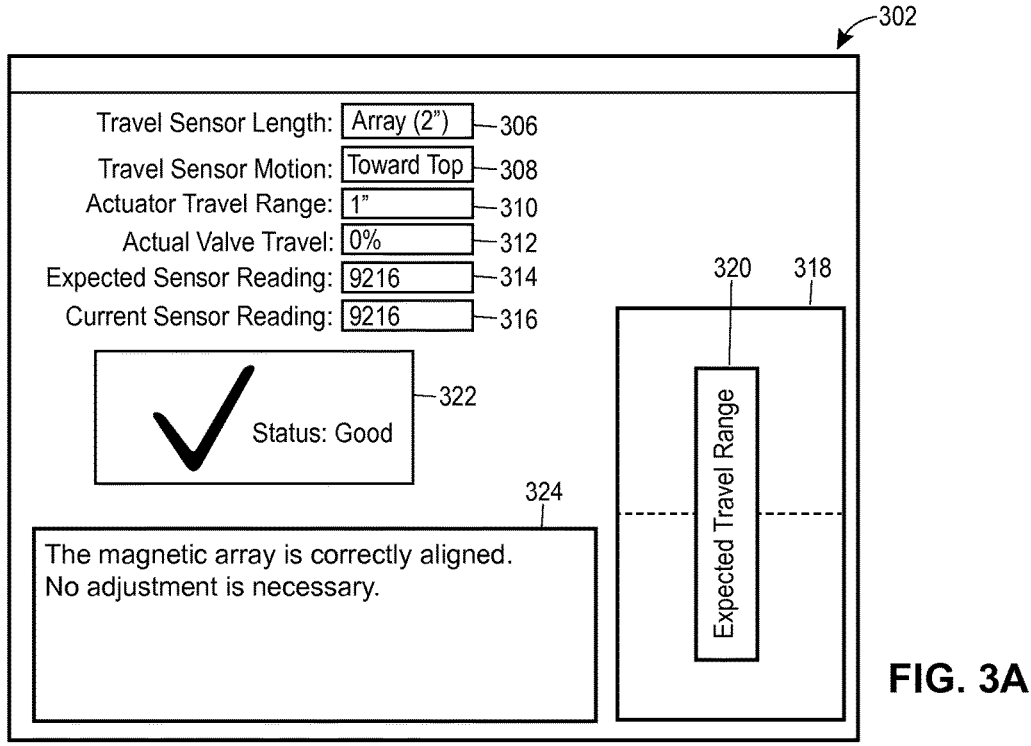
FIGS. 3A and 3B are screenshots representative of example graphical interfaces used for adjusting alignment of a magnetic travel sensor on a process control valve.
Figure 3B:
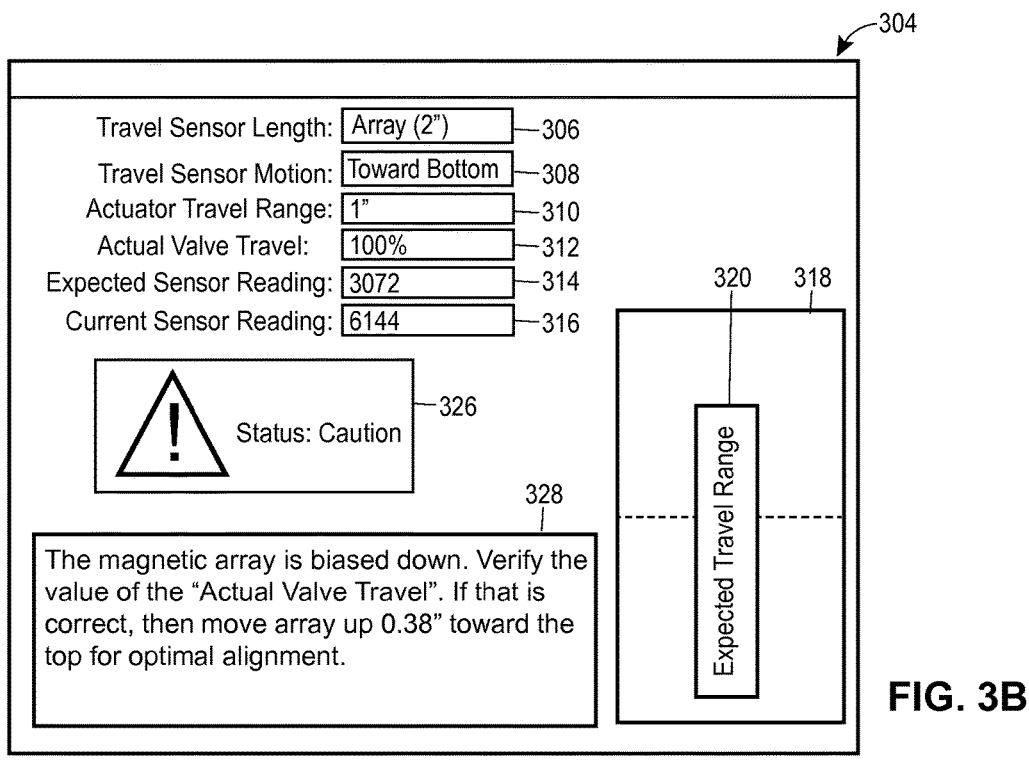

FIGS. 3A and 3B illustrate screenshots of example graphical interfaces 302 and 304, respectively, that may be used for adjusting alignment of a magnetic travel sensor on a process control valve. The graphical interfaces 302 and 304 may be in the form of computer executable instructions that are stored in a tangible computer-readable medium (e.g., 112 of FIG. 1) and executed using a processor (e.g., 110 of FIG. 1). Once executed, the graphica interfaces 302 and 304 may be displayed on a screen or interface of a device (e.g., 114 of FIG. 1) to enable interactions with a user or operator.

In an embodiment, the graphical interfaces 302 and 304 may be generated by implementing or executing the method 200 of FIG. 2. Each of the graphical interfaces 302 and 304 may include field boxes 306-312, which are used to gather various information associated with the magnetic travel sensor. In particular, the field box 306 may be used to gather information about the travel length of the feedback element in the magnetic travel sensor. The field box 308 may be used to gather information about the travel motion of the feedback element in magnetic travel sensor. In the embodiments of FIGS. 3A and 3B, the magnetic trave sensor is adapted for rectilinear motion and the feedback element is in the form of a magnetic array. Accordingly, the travel motion of the magnetic array is from end to end (e.g., towards the top or bottom).

The field box 310 may be used to gather information about the travel range of the actuator stem to which the magnetic array is coupled to. The actuator stem is part of an actuator used to operate the process control valve. The field box 312 may be used to gather information about the actual travel of the process control valve. Information gathered in the field boxes 306, 308 and 310 may be manually entered by the operator, or automatically populated by accessing predefined configuration settings. Information for the field box 312 may be manually entered by the operator as a visual estimation of the current physical position of the process control valve.

Once information in the field boxes 306-312 are determined or received, the graphical interfaces 302 and 304 may show the state of alignment by displaying an expected sensor reading in a field box 314 and a current sensor reading in a field box 316. The expected sensor reading is determined based on the information in the field boxes 306-312, while the current sensor reading is determined based on readings from the sensing element (e.g., a Hal effect sensor) which measures the movement of the magnetic array. The values in the field boxes 314 and 316 may be expressed in terms of raw travel counts (e.g., between 0 and 12,288), for example.

Further, the graphical interfaces 302 and 304 may visually depict the state of alignment by displaying an expected sensor travel range as shown in a window 308. In the embodiments of FIGS. 3A and 3B, the expected sensor travel range is represented as a movable solid bar 320 inside the window 318. The height of the window 318 represents the maximum available sensor range. Thus, any white spaces above and below the solid bar 320 wil represent the remaining available sensor range. In this manner, the state of alignment can be visualized by the solid bar 320 moving up or down inside the window 318.

When the solid bar 320 is centered in the window 318, perfect alignment is achieved. In other words, the feedback element or magnetic array is aligned perfectly with respect to the sensing element. If the solid bar 320 is off-center in the window 318, then the magnetic array may be biased either up or down. This means that while the magnetic array is still within the available sensor range, the magnetic array should be adjusted either up or down for better alignment. If the solid bar 320 is at either ends of the window 318, then the magnetic array may be on the verge of going beyond the lower or upper sensor limits. Accordingly, the magnetic array needs to be adjusted either up or down in order to maintain proper sensor operation.

FIG. 3A illustrates a scenario where the magnetic array is perfectly aligned as demonstrated by the centered solid bar 320 in the window 318. As such, the graphical interface 302 displays the state of alignment as "good" in a status box 322, and a corresponding message stating that no adjustment is required in a message box 324.

FIG. 3B illustrates a scenario where the magnetic array is biased down as demonstrated by the off-centered solid bar 320 in the window 318. As such, the graphica interface 304 displays the state of alignment as "caution" in a status box 326, and a corresponding message stating that a physical adjustment is required in a message box 328.

The following additional considerations apply to the foregoing discussion. Throughout this specification, plural instances may implement functions, routines, or operations structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signa transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additiona alternative structural and functional designs for a method and system for adjusting the alignment of a magnetic travel sensor on a process control valve can be used as well or instead. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for operating a process control valve based on a magnetic travel sensor reading and adjusting alignment of the magnetic travel sensor on a process control valve, the method comprising:

providing a magnetic travel sensor on the process control valve, wherein the magnetic travel sensor includes a feedback element and a sensor element;

determining, by one or more processors, a travel length of the feedback element of the magnetic travel sensor, the feedback element being coupled to an actuator stem of an actuator that operates the process control valve;

determining, by one or more processors, a travel range of the actuator stem;

determining, by one or more processors, a travel motion of the feedback element with respect to the sensor element of the magnetic travel sensor;

adjusting, by a control instrument, an adjusted position of the process control valve based on a process control valve drive control signal, wherein the process control valve drive control signal is representative of an expected sensor element reading;

determining, by one or more processors, a current position of the process control valve based on a current sensor element reading;

generating, by one or more processors, alignment information for the magnetic travel sensor based on a comparison of the current sensor element reading with the expected sensor element reading, and further based on the determined travel length of the feedback element, the travel range of the actuator stem, the travel motion of the feedback element, and the current position of the process control valve, wherein the alignment information is indicative of alignment of the feedback element with respect to the sensor element;

generating, by one or more processors, a graphical interface to display the alignment information:

correcting alignment of the feedback element with respect to the sensor element, based on the alignment information, when the alignment information indicates that the feedback element is misaligned with respect to the sensor element; and operating the process control valve, based on a sensor element reading, when the alignment information indicates that the feedback element is aligned with respect to the sensor element.

2. The computer-implemented method of claim 1, wherein generating the alignment information comprises:

calculating, by one or more processors, an expected sensor reading based on the determined travel length of the feedback element, the travel range of the actuator stem, the travel motion of the feedback element, and the current position of the process control valve;

determining, by one or more processors, a current sensor reading based on readings from a sensing element of the magnetic travel sensor that measures the movement of the feedback element; and comparing, by one or more processors, the expected sensor reading and the current sensor reading to determine a state of alignment between the feedback element and the sensing element.

3. The computer-implemented method of claim 2, further comprising:

determining, by one or more processors, an expected sensor travel range based on the expected sensor reading; and displaying, by one or more processors, the state of alignment in the graphical interface in terms of the expected sensor travel range and a maximum available sensor range, the maximum available sensor range being associated with the determined travel length of the feedback element.

4. The computer-implemented method of claim 3, wherein displaying the state of alignment in the graphical interface includes displaying a solid bar within a box, the solid bar having a height that corresponds to the expected sensor travel range, and the box having a height greater than the height of the solid bar and that corresponds to the maximum available senor range.

5. The computer-implemented method of claim 4, wherein the state of alignment indicates a perfect alignment when the solid bar is centered in the box.

6. The computer-implemented method of claim 4, wherein the state of alignment indicates a misalignment when the solid bar is off-centered in the box.

7. The computer-implemented method of claim 6, further comprising providing instructions in the graphical interface to instruct a user to physically adjust the feedback element in order to correct the misalignment.

8. The computer-implemented method of claim 6, further comprising sending an alert to notify a user of the misalignment.

9. The computer-implemented method of claim 1, wherein the feedback element is a magnetic array, and the sensing element is a magnetic sensor.

10. A non-transitory computer-readable storage medium including computer-readable instructions to be executed on one or more processors of a system for operating a process control valve based on a magnetic travel sensor reading and adjusting alignment of the magnetic travel sensor on a process control valve, the instructions when executed causing the one or more processors to:

receive, at the one or more processors, from a sensor element of the magnetic travel sensor, magnetic travel sensor data;

determine a travel length of a feedback element of the magnetic travel sensor based on the magnetic travel sensor data, the feedback element being coupled to an actuator stem of an actuator that operates the process control valve;

determine a travel range of the actuator stem;

determine a travel motion of the feedback element with respect to the sensor element of the magnetic travel sensor, wherein the travel motion is based on the magnetic travel sensor data;

adjust a position of the process control valve, to an adjusted position, based on a process control valve drive control signal, wherein the process control valve drive control signal is representative of an expected sensor element reading;

determine a current position of the process control valve based on a current sensor element reading;

generate alignment information for the magnetic travel sensor based on a comparison of the current sensor element reading with the expected sensor element reading, and further based on the determined travel length of the feedback element, the travel range of the actuator stem, the travel motion of the feedback element, and the current position of the process control valve, wherein the alignment information is indicative of alignment of the feedback element with respect to the sensor element;

generate a graphical interface to display the alignment information;

correct alignment of the feedback element with respect to the sensor element, based on the alignment information, when the alignment information indicates that the feedback element is misaligned with respect to the sensor element; and operate the process control valve, based on a sensor element reading, when the alignment information indicates that the feedback element is aligned with respect to the sensor element.

11. The non-transitory computer-readable storage medium of claim 10, wherein the instructions to generate the alignment information include instructions that, when executed, cause the one or more processors to:

calculate an expected sensor reading based on the determined travel length of the feedback element, the travel range of the actuator stem, the travel motion of the feedback element, and the current position of the process control valve;

determine a current sensor reading based on readings from a sensing element of the magnetic travel sensor that measures the movement of the feedback element; and compare the expected sensor reading and the current sensor reading to determine a state of alignment between the feedback element and the sensing element.

12. The non-transitory computer-readable storage medium of claim 11, further including instructions that, when executed, cause the one or more processors to:

determine an expected sensor travel range based on the expected sensor reading; and display the state of alignment in the graphical interface in terms of the expected sensor travel range and a maximum available sensor range, the maximum available sensor range being associated with the determined travel length of the feedback element.

13. The non-transitory computer-readable storage medium of claim 12, wherein the instructions to display the state of alignment in the graphical interface include instructions that, when executed, cause the one or more processors to display a solid bar within a box, the solid bar having a height that corresponds to the expected sensor travel range, and the box having a height greater than the height of the solid bar and that corresponds to the maximum available senor range.

14. The non-transitory computer-readable storage medium of claim 13, wherein the state of alignment indicates a perfect alignment when the solid bar is centered in the box.

15. The non-transitory computer-readable storage medium of claim 13, wherein the state of alignment indicates a misalignment when the solid bar is off-centered in the box.

16. The non-transitory computer-readable storage medium of claim 15, further including instructions that, when executed, cause the one or more processors to send an alert to notify a user of the misalignment.

17. The non-transitory computer-readable storage medium of claim 15, further including instructions that, when executed, cause the one or more processors to provide instructions in the graphical interface to instruct a user to physically adjust the feedback element in order to correct the misalignment.

18. A system for operating a process control valve based on a travel sensor reading and adjusting travel sensor alignment on the process control valve, the system comprising:
   a magnetic travel sensor including a feedback element and a sensing element; and
   a device coupled to the magnetic travel sensor, the device including a memory having instructions for execution on one or more processors, the instructions when executed by the one or more processors, cause the device to:
      determine a travel length of the feedback element, the feedback element being coupled to an actuator stem of an actuator that operates the process control valve;
      determine a travel range of the actuator stem;
      determine a travel motion of the feedback element with respect to the sensor element;
      adjust a position of the process control valve, to an adjusted position, based on a process control valve drive control signal, wherein the process control valve drive control signal is representative of an expected sensing element reading;
      determine a current position of the process control valve based on a current sensing element reading;
      generate alignment information for the travel sensor based on a comparison of the current sensing element reading with the expected sensing element reading, and further based on the determined travel length of the feedback element, the travel range of the actuator stem, the travel motion of the feedback element, and the current position of the process control valve;
      generate a graphical interface to display the alignment information, wherein the graphical interface provides information related to physical adjustments of the feedback element to correct alignment of the feedback element with respect to the sensor element;
      correct alignment of the feedback element with respect to the sensor element, based on the alignment information, when the alignment information indicates that the feedback element is misaligned with respect to the sensor element; and
      operate the process control valve, based on a sensor element reading, when the alignment information indicates that the feedback element is aligned with respect to the sensor element.

19. The system of claim 18, wherein the instructions of the device, when executed by the one or more processors, further cause the device to:
   determine an expected sensor travel range based on the expected sensor reading; and
   display the state of alignment in the graphical interface in terms of the expected sensor travel range and a maximum available sensor range, the maximum available sensor range being associated with the determined travel length of the feedback element.

20. The system of claim 18, wherein the feedback element is a magnetic array, and the sensing element is a magnetic sensor.

* * * * *

UNITED STATES PATENT AND TRADEMARK OFFICE
CERTIFICATE OF CORRECTION

PATENT NO. : 10,185,330 B2
APPLICATION NO. : 14/320225
DATED : January 22, 2019
INVENTOR(S) : Jimmie L. Snowbarger et al.

It is certified that error appears in the above-identified patent and that said Letters Patent is hereby corrected as shown below:

In the Specification

At Column 1, Line 45, "mechanica" should be -- mechanical --.

At Column 2, Line 11, "contro" should be -- control --.

At Column 2, Line 13, "trave" should be -- travel --.

At Column 2, Line 36, "trave" should be -- travel --.

At Column 2, Line 44, "trave" should be -- travel --.

At Column 2, Line 55, "trave" should be -- travel --.

At Column 2, Line 66, "contro" should be -- control --.

At Column 4, Line 34, "channe" should be -- channel --.

At Column 5, Line 16, "genera" should be -- general --.

At Column 5, Line 63, "physica" should be -- physical --.

At Column 5, Line 65, "usefu" should be -- useful --.

At Column 7, Line 27, "trave" should be -- travel --.

At Column 7, Line 31, "trave" should be -- travel --.

At Column 8, Line 42, "trave" should be -- travel --.

Signed and Sealed this
Twenty-ninth Day of October, 2019

Andrei Iancu
*Director of the United States Patent and Trademark Office*

CERTIFICATE OF CORRECTION (continued)
U.S. Pat. No. 10,185,330 B2

At Column 8, Line 55, "graphica" should be -- graphical --.

At Column 9, Line 1, "trave" should be -- travel --.

At Column 9, Line 25, "Hal" should be -- Hall --.

At Column 9, Line 32, "window 308." should be -- window 318. --.

At Column 9, Line 37, "wil" should be -- will --.

At Column 9, Line 62, "graphica" should be -- graphical --.

At Column 10, Line 66, "signa" should be -- signal --.

At Column 11, Line 66, "additiona" should be -- additional --.